(No Model.)

J. KELLAMS.
WATER WHEEL.

No. 298,477. Patented May 13, 1884.

WITNESSES
F. L. Ourand
G. B. Farris

INVENTOR
Jas. Kellams.
by C. A. Snowlles
Attorney

N. PETERS. Photo-Lithographer, Washington, D. C.

UNITED STATES PATENT OFFICE.

JAMES KELLAMS, OF ELLSWORTH, INDIANA.

WATER-WHEEL.

SPECIFICATION forming part of Letters Patent No. 298,477, dated May 13, 1884.

Application filed October 2, 1883. (No model.)

*To all whom it may concern:*

Be it known that I, JAMES KELLAMS, a citizen of the United States, residing at Ellsworth, in the county of Dubois and State of Indiana, have invented a new and useful Water-Wheel, of which the following is a specification, reference being had to the accompanying drawings.

My invention relates to turbine water-wheels, the object being to provide a wheel of this character of cheap, simple, and durable construction.

The invention consists in the improved construction and combinations of parts, hereinafter fully described, and pointed out in the claims.

Figure 1:
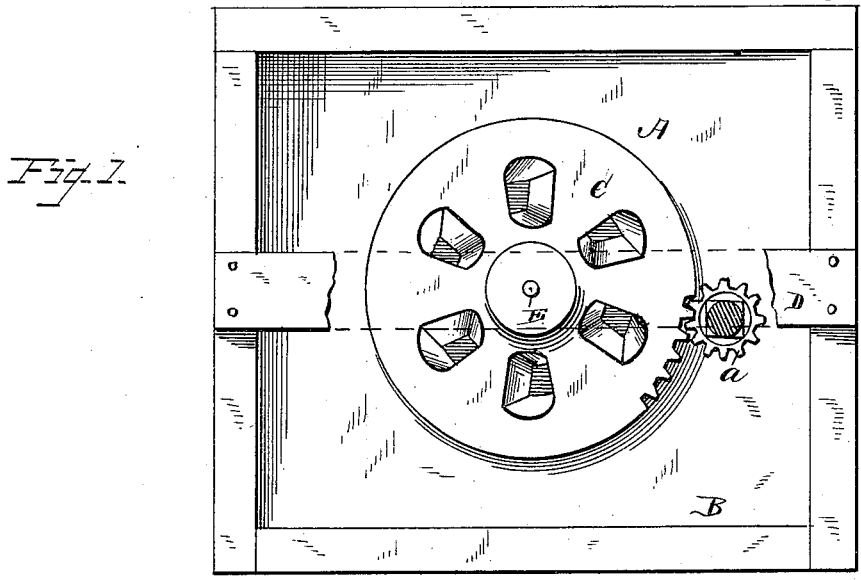
Figure 2:
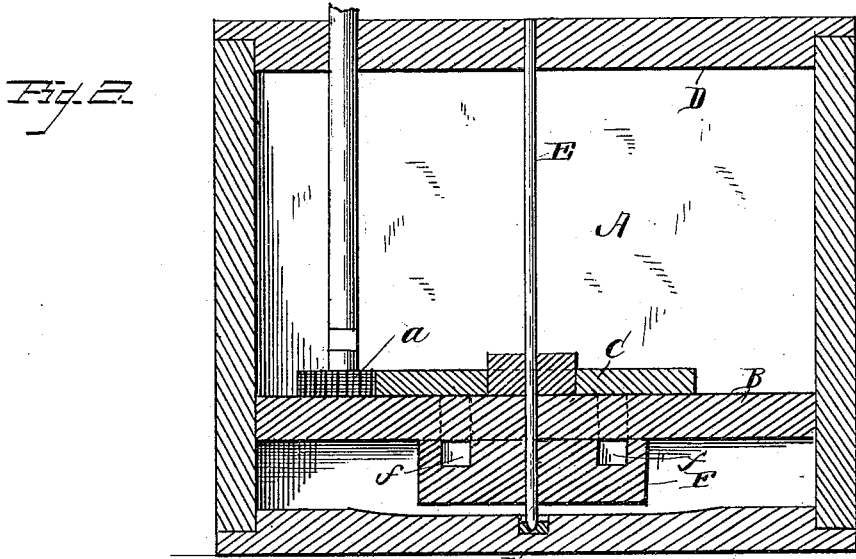
Figure 3:
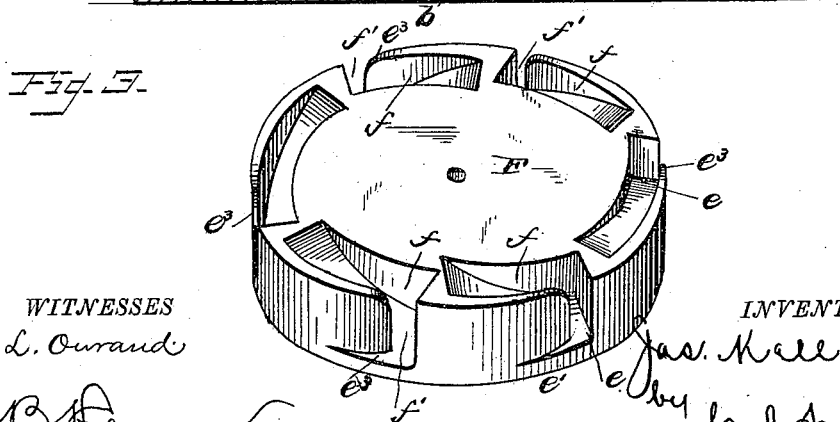

In the drawings, Figure 1 represents a plan view of the device in position for operation. Fig. 2 is a vertical transverse section of the same, and Fig. 3 is a perspective view of my improved turbine detached.

A represents the forebay, and B the floor of the same, which is formed with apertures for the passage of water to the turbine.

C represents a gate for shutting off the water from the wheel when it is desired to stop the same. The gate is formed on its peripheral edge with cogs or teeth adapted to be engaged by a pinion, $a$, having bearing in the floor B, when it is desired to open or close the gate.

D represents a beam, which is secured to the top of the forebay A.

E represents a shaft, which has bearing in the beam D at one end, and extends vertically through the forebay, and has bearing at its other end in the bottom $b$ of the said forebay.

F represents the turbine, which is rigidly mounted on the shaft E, between the floor B and bottom $b$, its upper side being in close contact with the floor B. This turbine F is formed with a series of vertical downwardly-inclined buckets $f$, formed on the peripheral edge of said wheel. The buckets are provided with radial openings or passages $f'$ for the escape of the water from the said buckets. The buckets are also beveled outwardly at the bottom of the buckets, as shown at $e$, and the peripheral edges $e'$ are formed with bevels $e^2$ to form sharp edges $e^3$.

The operation is as follows: The water enters the forebay, and the gate is opened by means of the pinion engaging the cogs or teeth on the edge of the gate, and the water passes through the openings in the floor directly into the buckets, and the wheel is revolved thereby, the water escaping through the openings of said turbine, thence through an opening in the forebay.

Having fully described my invention, what I claim as new, and desire to secure by Letters Patent, is—

1. The herein-described turbine, consisting of the wheel F, having the vertical peripheral inclined buckets $f$, the lower ends of which have downwardly-inclined radial openings or passages $f'$, the rear ends of the said buckets being beveled to form sharp edges $e^3$, substantially as set forth.

2. The combination, with the forebay and floor provided with openings, of a turbine-wheel mounted on a shaft in close contact to the under side of said floor, and having the inclined buckets $f$, provided with openings $f'$, and having beveled edges $e^3$, substantially as set forth.

In testimony that I claim the foregoing as my own I have hereto affixed my signature in presence of two witnesses.

JAMES KELLAMS.

Witnesses:
LEVI K. ELLIS,
JAMES M. ELLIS.